(12) United States Patent
Dioszegi et al.

(10) Patent No.: US 8,921,801 B2
(45) Date of Patent: Dec. 30, 2014

(54) DETECTION SYSTEM FOR HIGH-RESOLUTION GAMMA RADIATION SPECTROSCOPY WITH NEUTRON TIME-OF-FLIGHT FILTERING

(75) Inventors: Istvan Dioszegi, Middle Island, NY (US); Cynthia Salwen, Center Moriches, NY (US); Peter Vanier, Setauket, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 473 days.

(21) Appl. No.: 13/343,294

(22) Filed: Jan. 4, 2012

(65) Prior Publication Data

US 2012/0181435 A1    Jul. 19, 2012

Related U.S. Application Data

(60) Provisional application No. 61/430,586, filed on Jan. 7, 2011.

(51) Int. Cl.
| | | |
|---|---|---|
| *G01J 1/42* | (2006.01) | |
| *G01T 1/00* | (2006.01) | |
| *G01T 1/29* | (2006.01) | |

(52) U.S. Cl.
CPC .................................. *G01T 1/2985* (2013.01)
USPC .......................................... 250/394; 250/393

(58) Field of Classification Search
CPC ............. G01T 1/17; G01T 1/167; G01T 1/24; G01T 1/20; G01T 7/005
USPC ................................................. 250/394, 393
See application file for complete search history.

(56) References Cited

U.S. PATENT DOCUMENTS

| | | | |
|---|---|---|---|
| 5,936,240 A | * | 8/1999 | Dudar et al. ................... 250/253 |
| 7,151,447 B1 | | 12/2006 | Willms et al. |
| 7,420,175 B2 | | 9/2008 | Chu et al. |
| 2003/0165212 A1 | * | 9/2003 | Maglich ......................... 376/156 |
| 2006/0249684 A1 | * | 11/2006 | Ronaldson et al. ............ 250/395 |
| 2010/0302034 A1 | * | 12/2010 | Clements et al. ............. 340/540 |
| 2013/0327933 A1 | * | 12/2013 | Xu et al. ..................... 250/269.2 |

FOREIGN PATENT DOCUMENTS

WO    WO 2004/025245 A2    3/2004

OTHER PUBLICATIONS

Associated Particle Imaging (API), Report DOE/NV11718-223, Bechtel Nevada, Special Technologies Laboratory, 43 pages, Santa Barbara, California, May 1998.

Niedermayr, T., et al., "Gamma-ray imaging with a coaxial HPGe detector," *Nuclear Instruments and Methods in Physics Research A*, vol. 553, pp. 501-511, (2005).

(Continued)

*Primary Examiner* — David Porta
*Assistant Examiner* — Mindy Vu
(74) *Attorney, Agent, or Firm* — Dorene M. Price

(57) ABSTRACT

A γ-radiation detection system that includes at least one semiconductor detector such as HPGe-Detector, a position-sensitive α-Detector, a TOF Controller, and a Digitizer/Integrator. The Digitizer/Integrator starts to process the energy signals of a γ-radiation sent from the HPGe-Detector instantly when the HPGe-Detector detects the γ-radiation. Subsequently, it is determined whether a coincidence exists between the α-particles and γ-radiation signal, based on a determination of the time-of-flight of neutrons obtained from the α-Detector and the HPGe-Detector. If it is determined that the time-of-flight falls within a predetermined coincidence window, the Digitizer/Integrator is allowed to continue and complete the energy signal processing. If, however, there is no coincidence, the Digitizer/Integrator is instructed to be clear and reset its operation instantly.

25 Claims, 7 Drawing Sheets

(56) References Cited

OTHER PUBLICATIONS

Perot, B., et al., "Measurement of 14 MeV neutron-induced prompt gamma-ray spectra from 15 elements found in cargo containers." *Applied Radiation and Isotopes*, vol. 66, pp. 421-434 (2008).

Schmid, G., et al., "HPGe Compton Suppression Using Pulse Shape Analysis," *1998 Symposium on Radiation Measurements and Applications*, 18 pages, Apr. 15, 1998, (Ann Arbor, Michigan May 11-14, 1998).

* cited by examiner

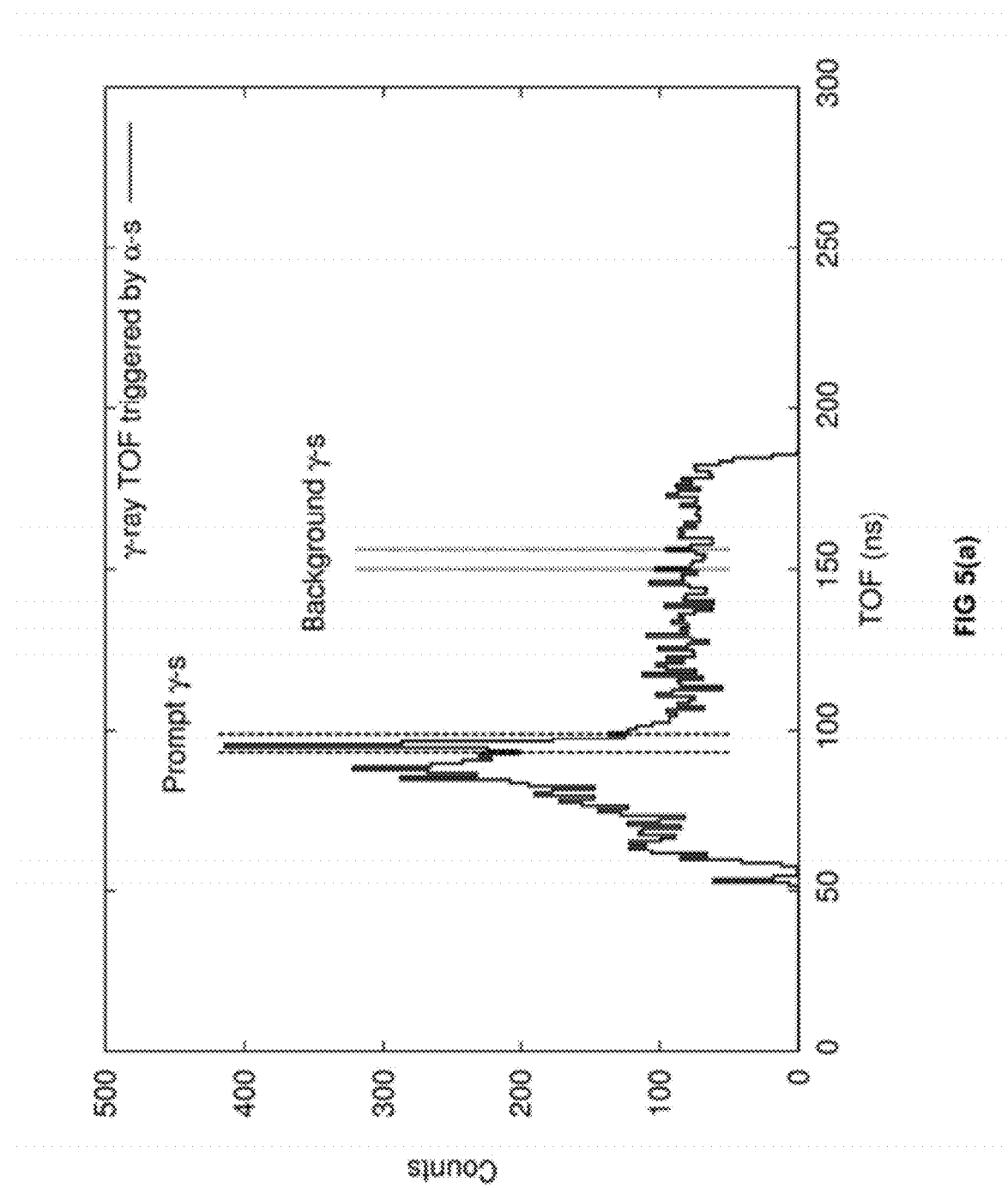

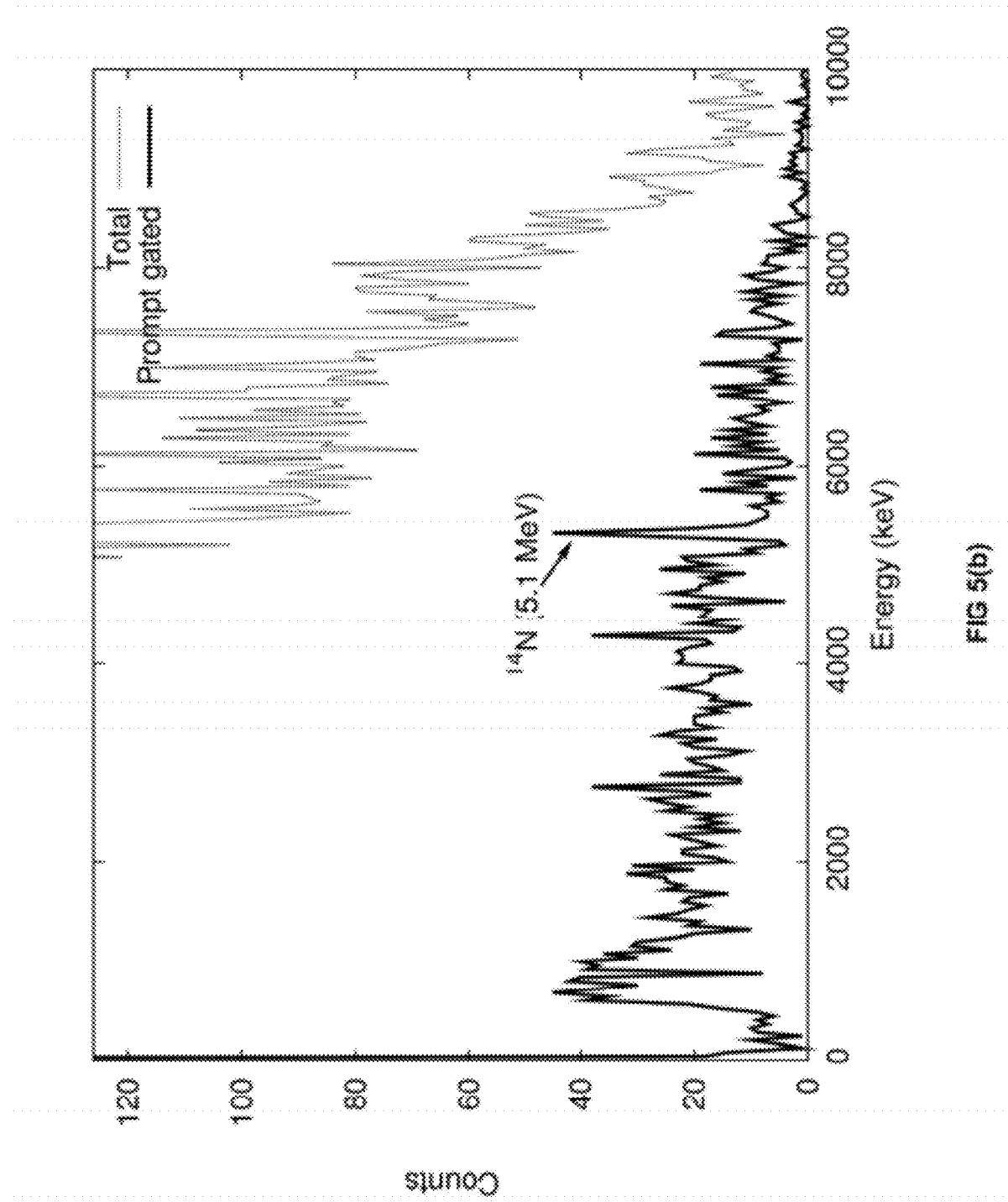

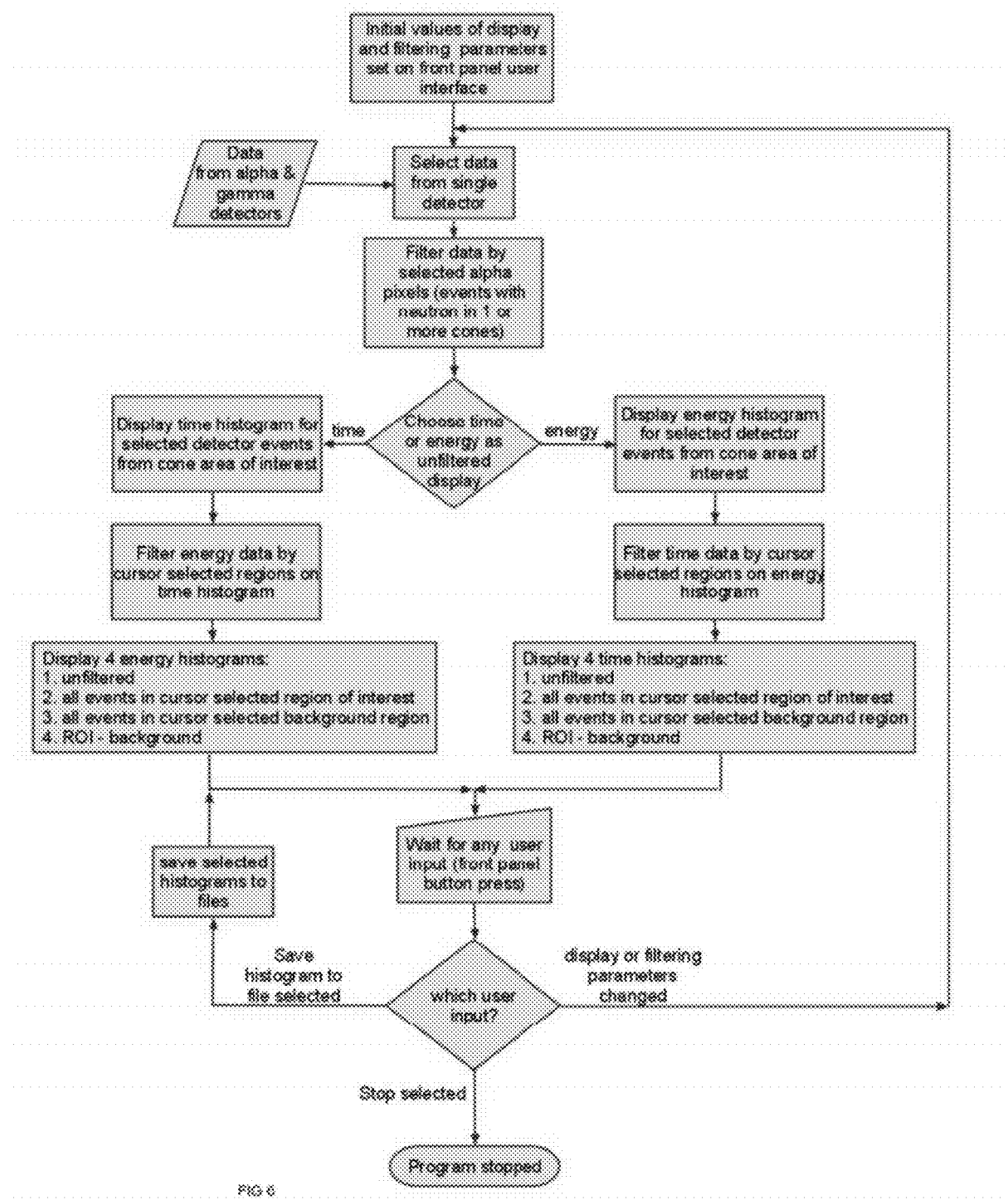

DETECTION SYSTEM FOR HIGH-RESOLUTION GAMMA RADIATION SPECTROSCOPY WITH NEUTRON TIME-OF-FLIGHT FILTERING

CROSS-REFERENCE TO RELATED APPLICATIONS

This application claims the benefit of U.S. Provisional Application No. 61/430,586, filed Jan. 7, 2011, which is incorporated herein by reference in its entirety.

STATEMENT OF GOVERNMENT RIGHTS

This invention was made with Government support under contract number DE-AC02-98CH10886, awarded by the U.S. Department of Energy. The Government has certain rights in the invention.

FIELD OF THE INVENTION

This invention relates generally to the field of gamma-radiation detection. In particular, the invention relates to a detection system for high-resolution gamma-radiation spectroscopy combined with neutron time-of-flight filtering.

BACKGROUND

Gamma-radiation ("γ-radiation") imaging is a well established imaging technique in the fields of nuclear medicine and astrophysics. In recent years, the outstanding ability of γ-radiation detectors to image and characterize any known as well as unknown γ-radiation source has been applied to other fields, such as biomedical research and investigation of suspicious target materials at airports. γ-radiation imaging can be used to gain information from concealed targets, such as explosives, drug- or nuclear-based contraband, and the like, or malignant tumors in the human body by accurately detecting the emitted signal from the target material.

One technique known for obtaining information from concealed targets via γ-radiation imaging utilizes neutron activation. Neutron activation is a process in which neutron radiation induces a radioactivity in the target material. Neutron activation is performed by irradiating neutrons into an area of the target material of interest, thereby exciting atomic nuclei within the target material. The excited nuclei are subsequently relaxed by emitting subatomic particles and/or γ-radiation. Appropriate detection of the γ-radiation and analysis of the detected spectrum facilitates the identification of a particular substance within the designated location of the target material.

Scintillation detectors such as sodium iodide (NaI) scintillators coupled with a photomultiplier tube (PMT) have been used for detecting γ-radiation induced from the target material by neutron activation. While scintillation detectors are known to have fast response times (in the order of nanoseconds) with relatively simple structure, they exhibit poor energy resolution of γ-radiation thereby causing, inter alia, a loss of information. Because γ emissions from different isotopes of the target material that have similar γ energy spectrums cannot be properly separated, there can be a loss of information.

Solid-state detectors such as silicon detectors, silicon-germanium detectors and high purity germanium detectors (HPGe) have been used in detecting γ-radiation of the target material irradiated by fast neutrons. Solid-state detectors include a substrate of semiconductor materials such as silicon, silicon-germanium, high purity germanium (HPGe) or the like, where each is placed between collecting electrodes. Semiconductor detectors are known to have a good energy resolution of the order of 0.1-0.3% for the HPGe detectors as compared to the scintillation detectors that provide an energy resolution on the order of 10%. The higher resolution of the semiconductor detectors are due primarily to the interaction of γ-radiation with the semiconductor material, which produces a charge that is directly collected by the electrodes. Semiconductor detectors, however, tend to have a relatively slow response time, of about 200 ns for the HPGe detectors, as compared to the scintillation detectors, which have a response time of about 1-2 ns. The slower response time of the semiconductor detectors are due primarily to the lag time of electrons drifting through the bulk thickness of the semiconducting material, before generating a detectable signal. As a result, the signals from the semiconductor detectors are usually shaped and integrated over a period of time of up to several microseconds.

Integrating the signal of semiconductor detectors over several microseconds tend to add high background levels of γ-radiation signals to the detected spectrum, thereby causing severe background noise. For example, additive γ-radiation signals coming from uncorrelated scattering events that are not directly related to the interaction of the neutrons with the target's nuclei are often generated during the relatively long integration time. Since the signal-to-background ratio (SBR) determines the quality of the detected spectrum, high background radiation signal levels are undesirable in γ-radiation imaging.

In view of these foregoing and other considerations, there is a need to develop novel imaging mechanisms that can provide high-resolution spectra with fast response times and improved signal-to-background ratios.

SUMMARY

A present objective is to provide a system and method that can effectively address the disadvantages and problems associated with conventional γ-radiation detection systems that use scintillation detectors having a relatively low resolution. It is a present goal to provide a system and method for γ-radiation detection that utilizes semiconductor detectors without the slow response time and signal-to-noise background problems inherent in the use of semiconductor detectors. Such system and methods may be useful, for example, for active interrogation of containers to detect explosives and/or special classes of nuclear materials.

Accordingly, a γ-radiation detection system that detects a γ-radiation from a target is disclosed. The γ-radiation detection system includes a neutron-generator that generates an alpha-particle and neutron pair (α-particle-neutron pair), and emits the α-particle and the neutron in opposite directions. The neutron beam emanating from the neutron generator is focused on a target within a predetermined direction and angle. The γ-radiation detection system also includes a position-sensitive α-detector that detects the α-particle emitted from the neutron generator and identifies the direction of the neutron on the target. The γ-radiation detection system further includes a γ-radiation detector that detects the γ-radiation emitted from the target irradiated by the neutron within the predetermined direction. Additionally, the γ-radiation detection system includes a data unit configured to acquire data related to energy of the γ-radiation when the γ-radiation detector detects the γ-radiation.

Furthermore, the γ-radiation detection system includes a control unit configured to calculate a time-of-flight of the neutron by comparing a time when the α-particle detector detects the α-particle (a first time) and a time when the γ-radiation detector detects the γ-radiation within the predetermined direction (a second time), and determine whether the γ-radiation is received within a predetermined window of time called a "coincidence window." In particular, the data unit is further configured to initiate the data acquisition process instantly, upon detection of a γ-radiation signal without waiting for the determination from the control unit. The control unit is further configured to allow the data unit to continue and complete the data acquisition process when it is determined that a timing of the detected γ-radiation falls within the predetermined coincidence window. The control unit is also configured to stop the data acquisition process when it is determined that the timing of the detected γ-radiation does not fall within the predetermined coincidence window.

In accordance with another aspect of the γ-radiation detection system, it further comprises a computer implemented apparatus for comparing the detected radiation signal with a known fingerprint of interest to determine identity of the target. Preferably, the γ-radiation detector is a semiconductor detector, and the semiconductor detector is a HPGe detector. In particular, the γ-radiation detection system further comprises one or more semiconductor detectors and one or more scintillation detectors.

In accordance with yet another aspect of the system, a method for detecting a γ-radiation from a target is disclosed. In this method, a neutron particle generator emits an α-particle-neutron pair in opposite directions. The neutron is focused on a target within a predetermined direction and angle. The α-particle is detected by a position-sensitive α-detector which identifies the direction of the neutrons generated towards the target. The γ-radiation emitted from the target within the predetermined direction is detected by a γ-radiation detector within the predetermined direction. The information from the detectors is then passed to the front-end electronics for processing, which hereinafter will be referred to as a time-of-flight controller (TOF Controller). The TOF Controller generally includes multiple sub-elements such as for example, generally, timing and logic control circuitry, such as specifically, time-to-digital converters (TDC), and a processing unit. However, it is also envisioned that the front-end electronics may comprise other electronic components to assist in the processing of the detected γ-rays and α-particles. Upon detecting the α-particle and the γ-radiation, the TDC unit of the TOF Controller digitizes the measured time between the start and stop pulses. The start is generated when the α-particle detector detects the α-particle and stop signal is the time when the γ-radiation detector detects the γ-radiation. This measured time is the sum of the time of flight of the neutron and the shorter time f flight of the γ-ray. A charge digitizer/integrator, collects the energy data of the detected γ-radiation. At the same time, the logic circuitry of the TOF Controller determines whether the γ-radiation is received within a predetermined coincidence window. Upon determining that the detected γ-radiation falls within the predetermined coincidence window (that is the event can be considered as a valid coincidence event, and the neutron and the emitted γ-ray are correlated), the digitizer/integrator continues and completes the data collecting process. However, if it is determined that the timing of the detected γ-radiation does not fall within the predetermined coincidence window, the logic circuitry of the TOF Controller halts the data digitization process and resets the front-end electronics for the next event. During this process, the digitizer/integrator initiates data collection upon detection of γ-radiation independent of the determining step.

In accordance with yet another aspect of the system, the method further includes a step of comparing the detected γ-radiation signal with a known γ-radiation fingerprint of interest to determine the identity of the target. Preferably, the γ-radiation detector used in the method is a semiconductor detector, and the semiconductor detector is advantageously a HPGe detector. More preferably, the γ-radiation detector used in the method comprises one or more semiconductor detectors and one or more scintillation detectors.

The above and other objectives and purposes of the present invention will become more apparent from the following description and illustrative embodiments which are described in detail with reference to the accompanying drawings.

BRIEF DESCRIPTION OF THE DRAWINGS

FIG. 5(*a*) is a graph that represents the γ-radiation counts over a time range, and FIG. 5(*b*) is a graph that illustrates the γ-radiation counts over the energy spectrum.

FIG. 6 is an exemplary data analysis diagram/flowchart for the analysis of a γ-radiation detection system of the present invention.

DETAILED DESCRIPTION

Figure 1:
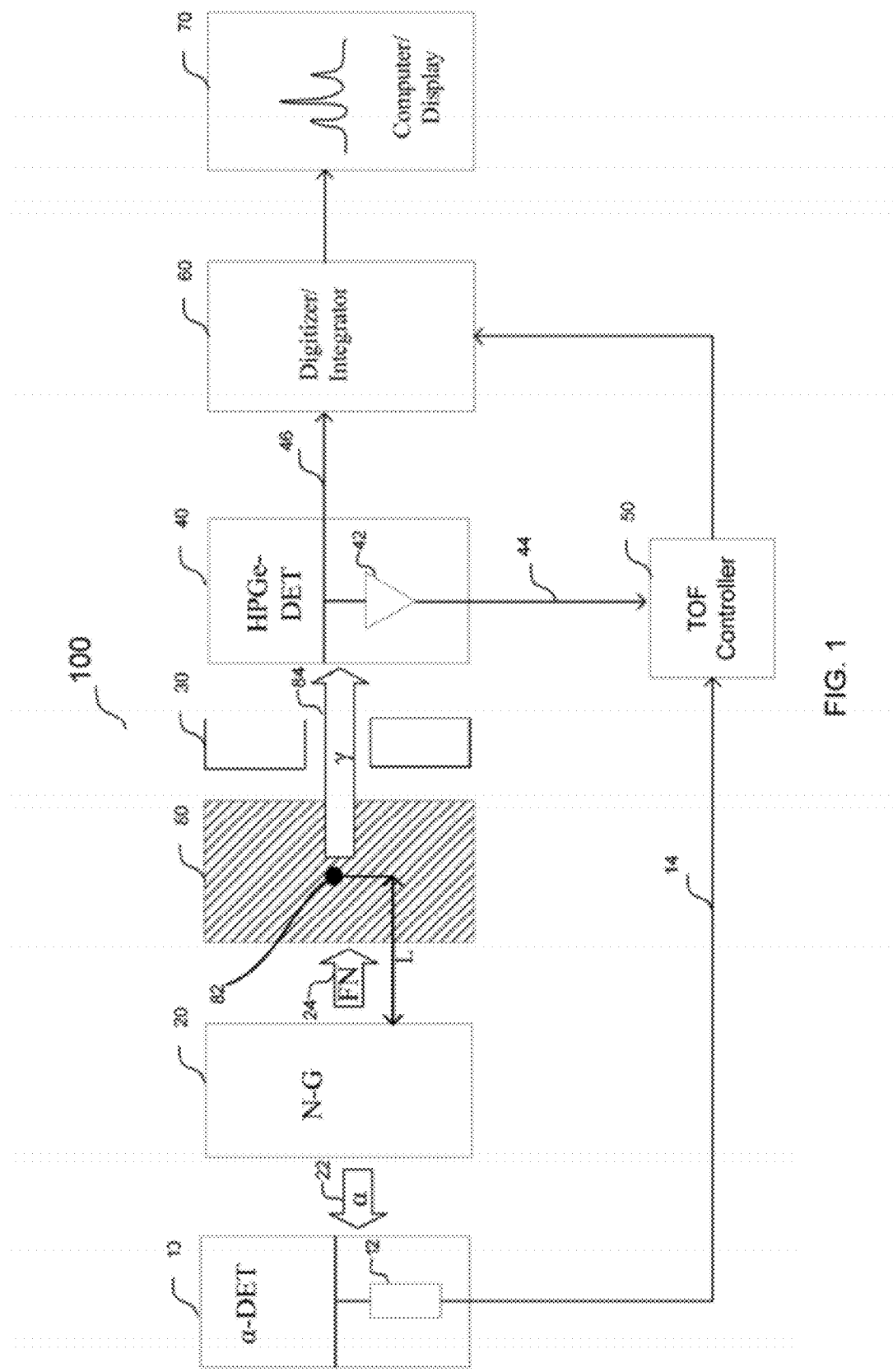
FIG. 1 is a schematic diagram of a γ-radiation detection system of the present invention.

These and other objectives will become more apparent from the following description and illustrative embodiments which are described in detail with reference to the accompanying drawings. Similar elements in each figure are designated by like reference numbers and, hence, subsequent detailed descriptions thereof may be omitted for brevity. In the interest of clarity, the following terms and acronyms are defined as provided below.

ACRONYMS

AND: AND Logic
CD: Compact Disc
CFD: Constant Fraction Discriminator
DVD: Digital Video Disc
D-T reaction: Tritium-Deuterium Reaction
ECL: Emitter-Collector-Logic
FNA: Fast Neutron Activation
HPGe: High-Purity Germanium Detector
FN: Fast Neutrons
NaI: Sodium Iodide
NG: Neutron Generator
OR: OR Logic
PMT: Photomultiplier Tube
PSA: Peak-Sensing Analog-to-Digital Converter
QDC: Charge-to-Digital Converter
RAM: Random Access Memory
ROM: Read Only Memory
R/W: Read and Write
SBR: Signal-to-Background Ratio
TDC: Time-to-Digital Converter
TG: Timing Gate TNA: Thermal Neutron Activation
TOF: Time-of-Flight
ZnO: Zinc Oxide

TERMS/DEFINITIONS

Alpha ($\alpha$)-particles: Particles consist of two protons and two neutrons bound together into a particle identical to a helium nucleus; hence, it can be written as $He^{2+}$ or $^4He^{2+}$.

Gamma ($\gamma$)-radiation: Electromagnetic radiation of very short wavelength produced by sub-atomic particle interactions, such as electron-positron annihilation, neutral pion decay, radioactive decay, fusion, fission or inverse Compton scattering in astrophysical processes.

Coincidence Window: A predetermined time period set for checking whether the detected $\gamma$-radiation is associated with specified $\alpha$-particles generated with neutrons that causes the $\gamma$-radiation.

Inelastic Scattering: A fundamental scattering process in which the kinetic energy of an incident particle is not conserved.

Neutron Activation: A process in which neutron radiation induces radioactivity in materials, and occurs when atomic nuclei capture free neutrons, becoming heavier and entering excited states. The excited nucleus often decays immediately by emitting particles such as neutrons, protons, or a particles.

Thermal Neutron Activation: A neutron activation process using relatively low energy neutrons having energies about 0.025 eV.

Time-of-Flight: An elapsed time that it takes for an object, particle or acoustic, electromagnetic or other wave to travel a distance through a medium.

A $\gamma$-radiation detection system that measures a high-resolution $\gamma$-radiation spectra is provided, including a neutron generator, a position-sensitive $\alpha$-particle detector, a semiconductor $\gamma$-radiation detector such as HPGe-Detector, a digitizer/integrator and a time-of-flight controller made up of at least a plurality of time-to-digital converters (TDC) and a logic circuitry that includes electronic circuitry used to control various operations of the system. A neutron is generated by the neutron generator and irradiated onto the target material. The neutron is associated with an $\alpha$-particle which is also generated by the neutron generator and is detected by the position-sensitive $\alpha$-detector. As a result, the $\gamma$-radiation detection system is configured to record the $\gamma$-radiation signal in coincidence with a signal from the $\alpha$-particle detector, thereby restricting the system to record $\gamma$-radiation signal generated only within a specific direction.

The $\gamma$-radiation detection system detects various $\gamma$-radiation signals originated from various sources. For example, a neutron irradiated onto the target material may cause inelastic scattering with the target's nuclei to generate a $\gamma$-radiation signal, called a prompt peak in a time-of-flight spectrum. Some neutrons are elastically scattered by the target material and deflected toward the $\gamma$-radiation detector to generate secondary $\gamma$-radiation signal that arrives at the $\gamma$-radiation detector later than the prompt $\gamma$-radiation signal. Furthermore, thermalized neutrons may generate a uniform background radiation distributed throughout the time-of-flight spectrum. Although, these three types of $\gamma$-radiation signals might be in coincidence with the $\alpha$-particle detector, only the prompt $\gamma$-radiation is useful for the analysis of the target material.

In particular, the electronic circuitry of the $\gamma$-radiation detection system is configured to compensate for the relatively long processing time of the semiconductor detector by utilizing a specific timing scheme, such as a selective application of a fast clear mode operation. For example, the $\gamma$-radiation detection system records the detected time of the $\alpha$-particle at the $\alpha$-particle detector and the detected time of the $\gamma$-radiation signal that arrived at the $\gamma$-radiation detector. Simultaneously, the system starts to collect the energy data of the detected $\gamma$-radiation. The system compares the two recorded times to calculate a time-of-flight of the neutron that generated the detected $\gamma$-radiation signal. The system (e.g., series AND circuit) determines whether the calculated time-of-flight falls within a predetermined time frame, called a coincidence window. If it is determined that the time-of-flight falls within the coincidence window, the system continues and completes the process of energy data collection. If, however, it is determined that the time-of-flight does not fall within the coincidence window, the system halts the digitization process. With these features, the system is capable of discriminating the prompt $\gamma$-radiation signal over the $\gamma$-radiation signal caused by elastically scattered neutrons and uniform background radiation, while effectively compensating for the relatively slow response of the semiconductor detector.

EXAMPLE 1

Figure 2:
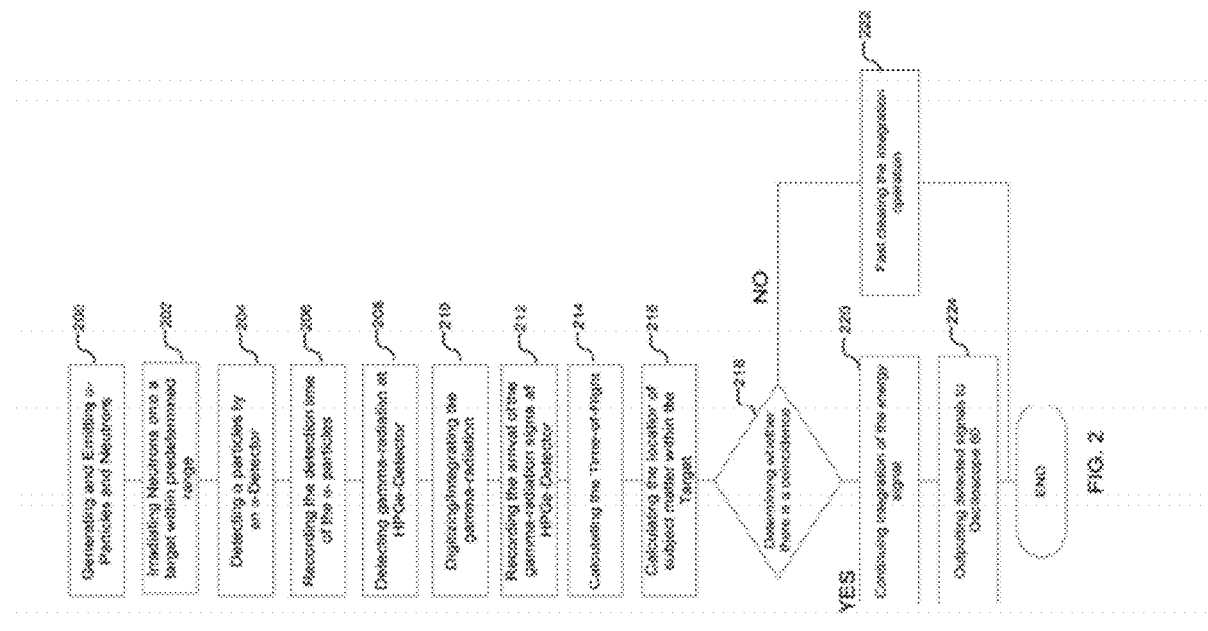
FIG. 2 is a flow chart that illustrate a series of operations in a γ-radiation detection system of the present invention.

FIG. 1 is a schematic diagram of $\gamma$-Radiation Detection System 100 for detecting and measuring a high-resolution $\gamma$-radiation spectrum, as contemplated by one embodiment. FIG. 2 is a flow chart that illustrates the operational steps of $\gamma$-Radiation Detection System 100 as illustrated in FIG. 1. A Target Object 80 to be tested by the detection system is also shown with the detection system 100. Target Object 80 may represent an object hidden inside a cargo container, suitcase or a region of interest in the human body from which one intends to gain information. The detection system includes an $\alpha$-Detector (Alpha-Detector) 10, NG (Neutron Generator) 20, a Filter 30, a solid-state semiconductor $\gamma$-radiation detector, preferably HPGe-Detector 40, a Time-Of-Flight (TOF) Controller 50, a Digitizer/Integrator 60 and a data processing device having a display such as Computer 70. It is noted that several peripheral elements such as timing electronics and logic circuitries are omitted from the $\gamma$-radiation detection system of FIG. 1 for the clarity of the drawing but will be described as necessary.

Initially, the $\alpha$-particles and neutrons are generated and emitted by Neutron Generator 20. Neutron Generator 20 generates pairs of $\alpha$-particle and fast neutron (Step 200 in FIG. 2), and each of $\alpha$-particle and neutron within a pair is emitted in opposite directions at 180° angle. In this embodiment, the fast neutrons are generated from (d,t) reaction. For example, an accelerated beam containing one or more subatomic species such as various ionized isotopes of hydrogen, including deuterium and tritium are used to bombard a specially constructed target. This process generates streams of subatomic particles such as fast neutrons and $\alpha$-particles, which simultaneously emanate in pairs from the targets in substantially opposite directions. As an example, a deuterium-tritium (D-T) generator that generates 14.2 MeV neutrons may be used, considering their desirable inelastic scattering properties with nuclei and their ability to penetrate significant thickness of common substances of the target object.

Neutron-induced reactions are well understood by persons of ordinary skill in the art. For this reason, a detailed description of neutron-induced reactions is omitted, so as not to unnecessarily obscure aspects of the present system. It should be noted, however, that when neutrons collide with nuclei of the target's atoms, a neutron either recoils or is deflected and, as a consequence of such interaction, the neutron gains or loses energy. This process is known as "inelastic scattering". If the neutron's energy is transferred to the nucleus, the nucleus is excited and a reduced energy neutron is produced. The excited nucleus promptly decays by emitting a γ-radiation.

The emitted neutrons 24 are irradiated on Target Object 80 within a predetermined direction determined by a position-sensitive α-Detector 10 (Step 202 in FIG. 2). Once the fast neutrons hit Target Object 80, the energetic neutrons interact with the nuclei 82 of carbon, nitrogen, or oxygen bearing (C:N:O) atoms of any explosives, chemical weapons/nerve agents within the target object. As a result, prompt quanta in the form of γ-radiation with specific energies are generated due to the inelastic collision between the irradiated neutrons and the nuclei of target molecules. Characteristic ratios of the C, N, and O molecules are known as "signatures" of known substances, which may be compared to the generated radiation signals of the target object being analyzed. It is noted that the energies of the γ-radiation has substantially discrete values which can be identified and stored.

However, not all the neutrons are inelastically scattered. Some neutrons bounce off of Target Object 80 without producing neutron-induced reactions and can impact upon HPGe-Detector 40, while other neutrons can interact with the Filter 30 that shields the detector. Other neutrons bounce off of background walls and then may hit the target at a later time than the neutrons that interact directly with the target, thereby generating secondary γ photons. Scattered neutrons and secondary γ photons are considered as "uncorrelated scattering events", which may be detected by HPGe-Detector 40 later than the γ-radiation produced by the inelastic scatterings. These uncorrelated scattering events produce background interference causing noise.

In order to reduce background interference from the uncorrelated scattering events, γ-Radiation Detection System 100 is preferably configured to process only γ-radiation emitted during the direct inelastic scattering. To that end, data acquisition and timing electronics are specifically configured to filter out uncorrelated scattering events by measuring the time-of-flight of the neutrons, so that the detection system only records events in which a γ-radiation was emitted within a predetermined window of time from the time the neutron was emitted, called a coincidence window. Thus, signals from secondary γ-radiation in the background environment are rejected. As a result, high resolution spectra with no background interference can be obtained.

Subsequently, the generated α-particles 22 are detected by a position-sensitive α-particle Detector 10 (Step 204 in FIG. 2). In particular, the α-particle detector may be pixilated so that the direction of each neutron can be measured within a cone having a predefined angle, such as 12 degrees. Furthermore, each of the neutrons is associated with a corresponding α-particle by a detector-detector coincidence mechanism, thereby restricting the γ-radiation detection system to view only a portion of the target material irradiated by neutrons emanated from a specific direction within the predefined cone. An example of α-particle Detector 10 is a Hamamatsu H6568 photomultiplier tube with a 16-pixel Gallium-doped zinc oxide ZnO(Ga) phosphor-coated α detector that can provide a timing pulse with a timing width of approximately 20 nanoseconds (ns). The detected signals 14 are then sent to TOF Controller 50 after passing through Delay element 12 to match the delay in the γ-radiation signal 44 caused by Amplifier 42. TOF Controller 50 records the time when the α-particle is detected at the α-particle detector 10 (Step 206 in FIG. 2).

The generated γ-radiation 84 emitted from the neutron irradiated Target Object 80, on the other hand, is detected by HPGe-Detector 40 (Step 208 in FIG. 2). As an example, any large efficiency HPGe detectors made by ORTEC Inc. (Oak Ridge, Tenn.) or Canberra Industries, Inc. (Meriden, Conn.) may be used for the γ-radiation detector 40. Since HPGe-Detector 40 is associated with α-particle Detector 10, it allows for detecting γ-radiation signal originated from a portion of the target object restricted within the neutron radiation cone, predetermined by the pixilated α-particle Detector 10. The γ-radiation detector 40 splits the detected signal into a timing signal 44 and an energy signal 46, processing the two signals independently. HPGe-Detector 40 may include sub-electronics such as a preamplifier 42 and/or a fast filter amplifier. Alternatively, these amplifiers may be built outside the detector, as it is known to those of ordinary skill in the art. A Filter 30 may be placed before HPGe-Detector 40 preventing unnecessary signals, such as scattered neutrons, from entering into the HPGe-Detector. Timing signal 44 from the γ-radiation detector 40 is sent to TOF controller 50 after passing through amplifier 42. Upon receiving the timing signal from HPGe-Detector 40, TOF Controller 50 records the arrival time of γ-radiation at HPGe-Detector 40. (Step 212 in FIG. 2).

Once both signals (14, 44) reach the TOF Controller 50, the TOF Controller 50 records the time when the α-particle is detected at the α-particle detector 10 and the time when the γ-radiation is detected at the γ-ray detector 40. Based on this information, the exact location inside Target Object 80, where the γ-radiation is generated, i.e., the time-of-flight information can be determined. The calculated time-of-flight of neutrons (Δt) enables the determination of the length (L) between the neutron generator and the exact location 82 inside the Target Object 80 where the γ-radiation is generated using the known speed of the neutrons, v, i.e., L=v×Δt, as illustrated in FIG. 1. Therefore, knowing when a given neutron beam pulse starts, and measuring the time when a given γ-radiation is detected, makes it possible for the TOF Controller to determine the time-of-flight of the pulsed beam of neutrons responsible for producing the detected γ-radiation (Step 214 in FIG. 2). This time-of-flight information, coupled with known velocity of the neutron as determined by the kinematics of the neutron producing reaction, allow the TOF Controller to make a fairly accurate determination as to the location within the Target Object along the beam path where the γ-radiation originated.

Subsequently, TOF Controller 50 of γ-Radiation Detection System 100 determines whether the detection time by HPGe-Detector 40 falls within a predetermined window of time called a "coincidence window." (Step 218 in FIG. 2). TOF Controller 50 generally includes multiple sub-elements such as timing and logic control circuitry which are not shown in FIG. 1. For example, a pulse of the timing signal 44 ($\tau_\gamma$) from HPGe-Detector 40 is amplified with a wide bandwidth amplifier 42 and the rise time of the leading edge in the pulse is measured to generate a "fast trigger" signal to trigger a constant fraction discriminator (CFD) which may reside in TOF controller 50. The CFD produces a logical pulse if a specified minimum threshold voltage level has been met. A separate CFD must be installed in TOF Controller 50 to deal with the timing signal 14 ($\tau_\alpha$) from α-particle Detector 10. TOF Controller 50 must also include a time-to-digital converter (TDC) configured to receive an emitter-collector logic (ECL) output signal from the CFD to start a timing measurement for each detection event.

In particular, after the CFD initiates a fast clear and starts digitization, the logic circuitry of the TOF Controller 50 determines whether the coincidences in the α-particle and γ-ray time of flight are observed. If the coincidences indeed are observed, the logic circuitry then vetos the fast clear, thereby allowing the TOF Controller 50, Digitizer/Integrator 60, and a processing device 70 to complete the recording of the energy and TOF (Step 220 in FIG. 2). If not satisfied, that is, α-particle(s) are detected without the coincidental γ-rays, the logic circuitry clears the units and reinitiates the digitization (Step 222 in FIG. 2). For example, the logic circuitry of the TOF Controller 50 may be configured to set a 10 ns time window after a certain time when α-particle Detector 10 detects the α-particle. Upon determining whether the calculated time-of-flight falls within the coincidence window, the logic circuitry of the TOF Controller 50 issues a command to the TDC and Digitizer/Integrator 60 units to either continue recording or reinitialize. For example, if it is determined that the calculated time-of-flight falls within the coincidence window, the logic circuitry of the TOF Controller 50 vetoes a fast clear command, thus allowing Digitizer/Integrator 60 to continue and complete the on-going digitization and integration operation of the energy signal at Digitizer/Integrator 60. During this time, TOF Controller 50 may block subsequent time-of-flight measurements while digitizer/Integrator 60 continues to complete the recording operation, thereby preventing multiple triggering by the TOF Controller. If, however, it is determined that the calculated time-of-flight does not fall within the coincidence window, TOF Controller 50 allows the fast clear command to proceed to Digitizer/Integrator 60, thereby, resetting the on-going digitization and integration operation instantly so that Digitizer/Integrator 60 does not store unnecessary signal data caused by, for example, elastic scatterings.

It is noted that the γ-radiation detection signals are sent from HPGe-Detector 40 to TOF Controller 50 after passing through an amplifier 42 that causes a delay for the γ-radiation detection signals received at the TOF Controller. To synchronize the signal from HPGe-Detector 40 with the signal from α-particle Detector 10, Delay Element 12 delays the α-particle detection signals 14 for a predetermined period of time (e.g., 200 nanosecond).

Digitizer/Integrator 60 digitizes and integrates the energy signal 46 received from HPGe-Detector 40 and sends the integrated energy signal to Computer 70 (Step 210 in FIG. 2), which displays and processes the γ-radiation spectrum collected from HPGe-Detector 40. Digitizer/Integrator 60 may include, among other elements, a high precision peak-sensing analog-to-digital converter (PSA) configured to shape and integrate the energy signal received from HPGe-Detector 40, as well as a storage device to store the integrated energy signal. The Computer 70 may further analyze the spectrum to identify specific substances, such as explosives in Target Object 80, using software such as LabView Virtual Interface (VI). (National Instruments Corp. Austin, Tex.). Specifically, the recorded data is processed to select only events, which were in the "prompt" time window, and the "background" time window, thereby, rejecting random events. The final spectrum is the difference of the prompt and background energy spectra.

While γ-Radiation Detection System 100 as illustrated in FIG. 1 utilizes a single semiconductor γ-radiation detector such as HPGe-Detector 40 for the purpose of clearly describing the present system, it is contemplated to be within its scope that multiple HPGe-Detectors may well be combined in parallel to form the present detection system. Moreover, different types of detectors such as a scintillation detector (e.g., NaI-Detector) may also be utilized to form the present detection system either independently or in combination with other types of detectors. For example, the detection system may include at least one HPGe-Detector along with at least one scintillation detector thereby complementing the advantages of both types of detectors. It is noted that a charge-to-digital converter (QDC) needs to be added to the detection system to collect the energy signals if the scintillation detector is used. The energy signals from the multiple γ-radiation detectors may be combined and integrated in Digitizer/Integrator 60. Alternatively, the signals from the multiple γ-radiation detectors may be combined and processed at other portion of elements such as Computer 70 equipped with a built-in processor.

When the digitization and integration process is completed by Digitizer/Integrator 60, the Digitizer/Integrator 60 may store the recorded data of the γ-radiation detection signal and output the signals to Computer 70 to display the γ-radiation spectrum on a display device (step 224 in FIG. 2). The γ-radiation spectrum may be analyzed, along with the distance information (L) calculated by TOF Controller 50 to identify the specific explosive signatures (e.g., N:C:O) and their locations inside Target Object 80. (Step 216 in FIG. 2). Appropriate software may be used for such analysis.

EXAMPLE 2

Figure 3:
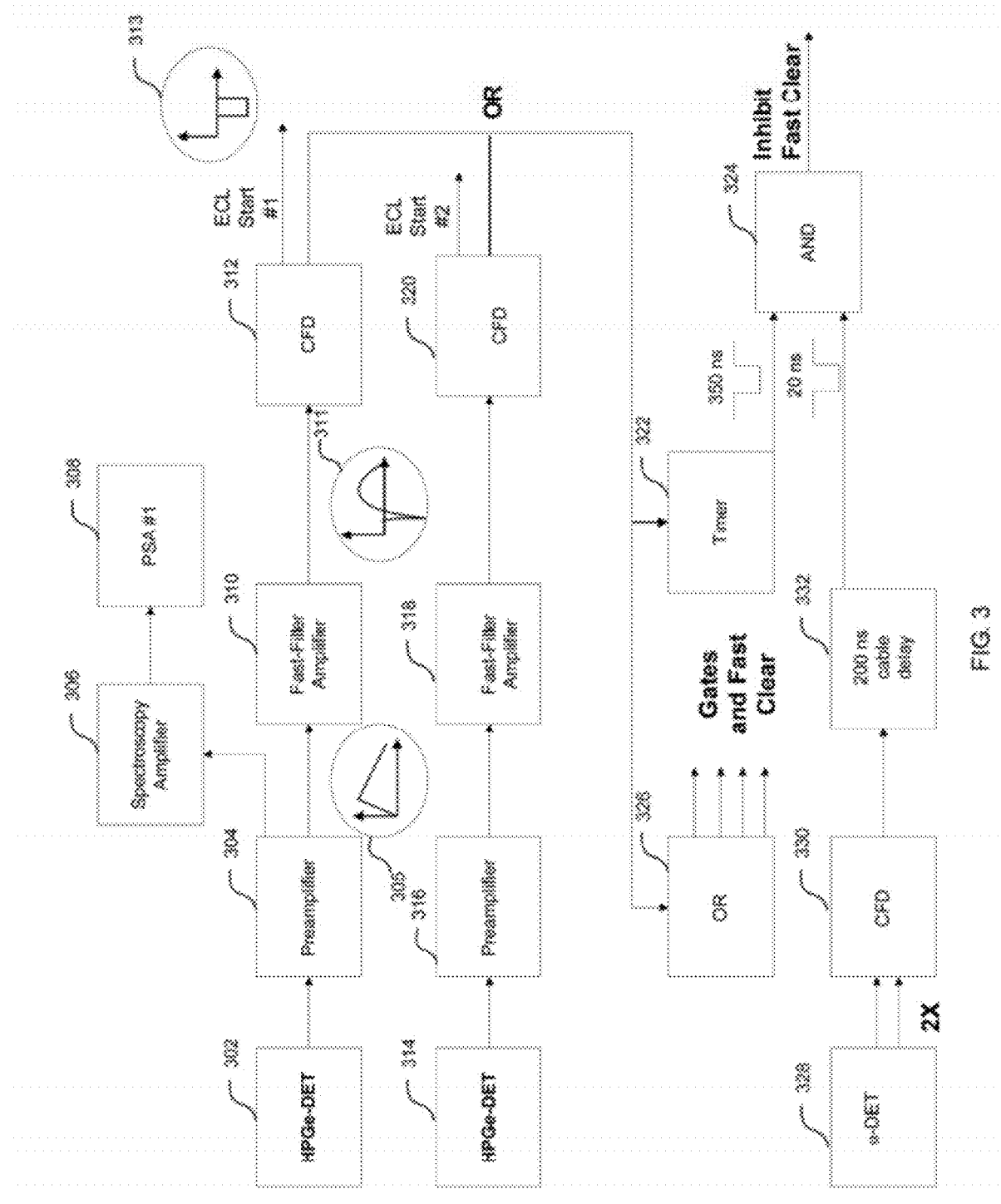
FIG. 3 is a partial block diagram of the electronics of a γ-radiation detection system according to the present invention that incorporates two HPGe-Detectors 302, 314 in parallel.

FIG. 3 is a partial block diagram of the electronics of γ-Radiation Detection System 100 that incorporates two HPGe-Detectors 302, 314 in parallel, as an exemplary embodiment. As described above, although only two HPGe-Detectors are used in this exemplary embodiment, any number of detectors may be utilized to build γ-Radiation Detection System 100. Each of HPGe-Detectors 302, 314 outputs a radiation signal to corresponding Preamplifiers 304, 316 and each of the Preamplifiers outputs at least two signals: an energy signal and a timing signal. The energy signal is output to a Spectroscopy Amplifier 306, such as 672 ORTEC, which outputs a shaped signal suitable for input to PSA 308 such as CAEN V785N. Although not shown in FIG. 3, HPGE-Detector 314 typically has its own Spectroscopic Amplifier and a Peak-Sensing Analog-to-Digital Converter (PSA) unit separated from the Spectroscopy Amplifier 306 and the PSA 308 of HPGe-Detector 302. Alternatively, each of Spectroscopy Amplifier 306 and of PSA 308 may be configured with a multi-channel capability to handle multiple signals from multiple γ-radiation detectors including HPGe-Detector 304, so that each of the Spectroscopy Amplifier and PSA may be shared by multiple γ-radiation detectors.

Referring to FIG. 3, the timing signal from Preamplifier 304 (or 316) may not be suitable to drive CFD 312 (or 320), such as ORTEC CF8000, directly because the timing signal tends to be too slow and may have an incorrect polarity as illustrated in insert 305 in FIG. 3. As a result, this embodiment utilizes Fast Filter Amplifier 310 (or 318), such as ORTEC 579, in between the Preamplifier 304 (or 316) and the CFD 312 (or 320), thereby conveying the signal output from the Preamplifier to the CFD without errors. Fast Filter Amplifier 310 may provide a fast rise time of about 8 ns negative polarity signal, as illustrated in insert 311, that is able to trigger the CFD. The CFD then outputs two signals: an emitter coupled logic (ECL) start signal for an multi-channel multi-event time-to-digital converter (TDC) (not shown in FIG. 3), and an OR output signal to drive the following event logic. The OR output of the CFD drives Timer 322, such as CAEN V993B, that generates a signal with a predetermined width of about 350 ns to be fed into AND logic unit 324, such as CAEN V976.

The same OR output signal from CFD 312 is also fed into OR logic unit 326, such as CAEN V976, that drives multiple timer units in this embodiment. For example, OR logic unit 326 may generate gate signals for PSA 308 connected to HPGe-Detector 302, to inhibit signals for all of CFD 312 and prevent double triggering if there is coincidence between the α-particles and the γ-radiation detection signals. A fast clear signal is utilized to reset the integration process if there is no coincidence. OR logic unit 326 may also generate a gate signal for a charge-to-digital converter (QDC), if a scintillator detector such as NaI detector is included in γ-Radiation Detection System 100. Although the description has been made only for the first HPGe-Detector 302, an ordinary skilled artisan would understand that a similar description may be equally applied to the second HPGe-Detector 314 and associated signal flow as well.

The detection signal from α-particle Detector 328 is simultaneously received at CFD 330, such as CAEN V812, on a separate signal path. It is noted that in this embodiment the α-particle Detector 328 as a multi-channel detector, is capable of generating detection signals for two HPGe-Detectors 302, 314. Alternatively, a separate α-particle Detector may be used for a single HPGe-Detector. The detection signal from CFD 330 is delayed with a predetermined time period of about 200 ns by Delay Element 332 to synchronize with the delayed HPGe detection signal caused by an amplification of the HPGe detection signal. The delayed signal is then input to AND logic unit 324 to generate, among others, an inhibit signal, a fast clear signal and a common stop signal for the TDCs.

EXAMPLE 3

Figure 4:
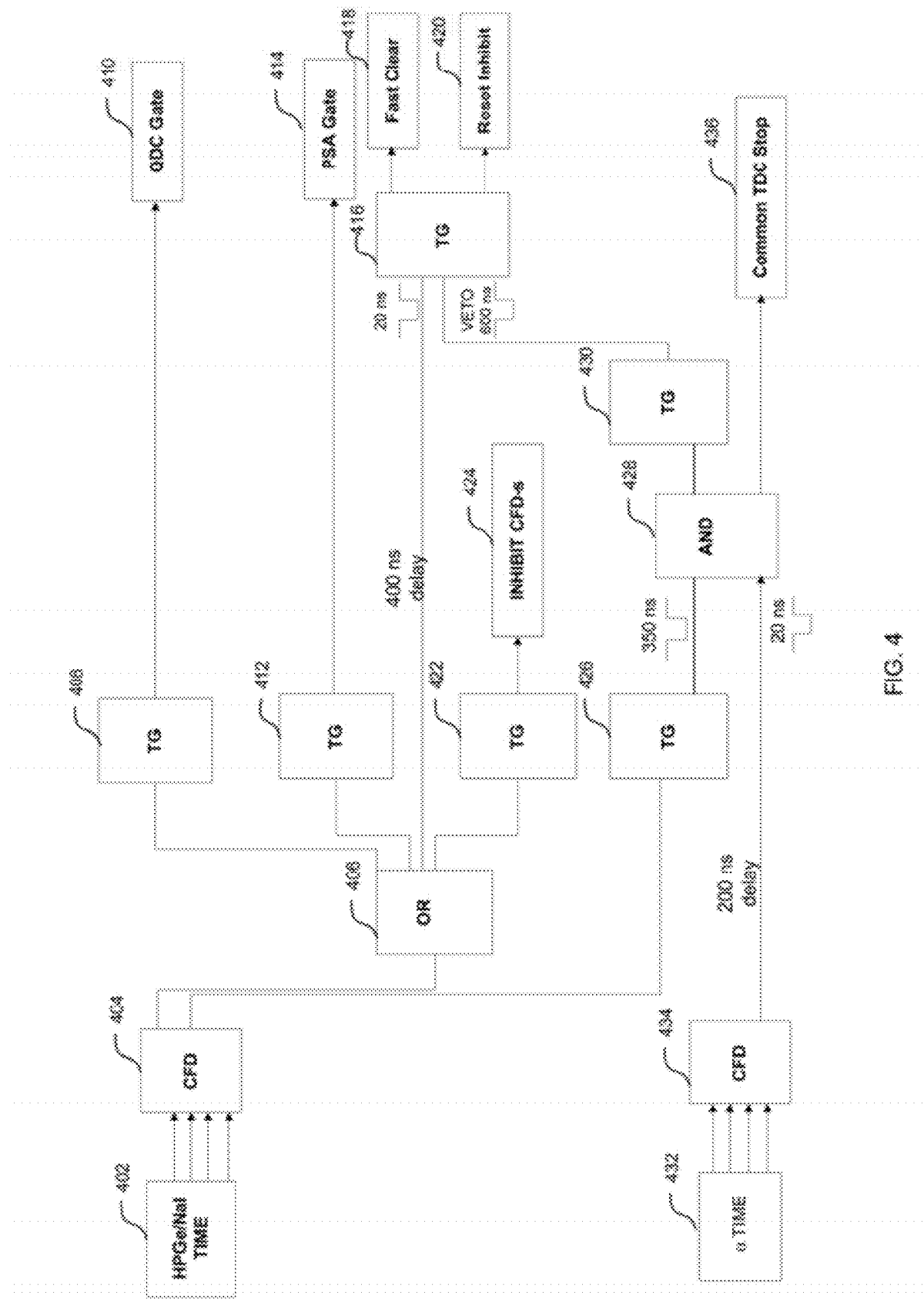
FIG. 4 is a partial block diagram of the timing electronics of a γ-radiation detection system of the present invention.

FIG. 4 illustrates a partial block diagram of the timing electronics of γ-Radiation Detection System 100 showing the timing logic of the system. Four timing signals corresponding to four channels are output from HPGe/NaI Time 402 representing four channel signals from four γ-radiation detectors including at least one HPGe-Detector and one NaI-Detector in this exemplary embodiment. The timing signals from HPGe/NaI Time 402, after being amplified and shaped by a fast filter amplifier, such as ORTEC 579, are fed into CFD 404, such as CAEN CF 8000. As explained above regarding FIG. 3, the emitter-collector logic level (ECL) output signals from CFD 404 may be directly connected to a corresponding time-to-digital converter (TDC), such as CAEN V775, and each of the corresponding TDCs may start a timing measurement upon receiving a signal from a corresponding CFD.

The outputs from CFD 404 are fed into an OR logic unit 406, such as CAEN V976, and the output signals from the OR logic unit 406 drives four timing gates TG 408, 412, 416, 422, such as CAEN V993B, in this exemplary embodiment. A first output signal from the OR logic unit 406 is input to timing gate TG 408 which generates a gate signal of predetermined length, about 800 ns, for a QDC Gate 410, such as CAEN V792, which is configured to process the signals from the NaI Detector. A second output signal form OR logic unit 406 is input to timing gate TG 412 which generates a gate signal of predetermined length, about 5 ns for PSA Gate 414, such as CAEN V785N, which is configured to process the signals from the HPGe-Detector.

A third output from OR logic unit 406, after being delayed by a predetermined time period of about 400 ns is input to timing gate TG 416, which generates in combination with an input from timing gate TG 430, an input signal for a fast clear operation 418, as well as a reset inhibit operation 420 of the CFDs. The fourth output from OR logic unit 406 is input to timing gate TG 422, which generates an inhibit signal 424 for CFDs 404, 434 will inhibit the CFDs for the duration of the γ-radiation signal read out and processing time of about 2.5 ms when appropriate.

A secondary output from CFD 404 is input to timing gate TG 426, which generates a timing gate signal of predetermined length of about 350 ns, defined as "a coincident window" for the γ-radiation signal in this exemplary embodiment. AND logic unit 428 used in this embodiment may be as CAEN V976. The V993B timer, such as timing gate TG 426, may be appropriately adjusted to set the coincidence window. The defined coincidence window, preferably about 350 ns, is then input to AND logic unit 428 that generates an input signal to timing gate TG 430 which in turn generates a secondary input signal, such as an about 600 ns wide veto signal to timing gate TG 416 that generates, in combination with the output from OR logic unit 406, an input signal for a fast clear operation 414, instantly clearing the digitization and integration of the γ-radiation signal. Timing gate TG 416 also generates an input signal for a reset of the inhibiting operation 420 for the CFDs, resetting the CFDs when there is no coincidence between the γ-radiation signal and the associated α-particles. Furthermore, AND logic unit 428 also generates a common stop signal for the TDCs which will stop the operation of the TDCs while a coincidence event between the γ-radiation signal and α-particles occurs.

In contrast, the timing signals from α-Time 432 drives a secondary CFD 434, such as CAEN V812. The output of the CFD 434 is delayed for a predetermined period, preferably about 200 ns, to synchronize with the γ-radiation signal which has been delayed by the fast filter amplifier. Specifically, the output signal from CFD 434 may be maintained to have a predetermined time width, preferably about 20 ns, defined as "a coincidence window" for the α-particles. As explained above, if the coincidence window of both of the γ-radiation signal from CFD 404 and α-particles from CFD 434 overlaps, a coincidence event is identified.

As explained above, because the output signal from CFD 434 needs to be delayed to be synchronized with the γ-radiation signal by a predetermined time of about 200 ns, all other linear signals may also have to be delayed by more than the predetermined 200 ns to obtain a meaningful signal indicating whether a coincidence event exists. However, delaying all the linear signals, including the energy signals of the detected γ-radiation signal may cause significant side effects including attenuation of the signals and the introduction of noise into the system due to signal attenuations.

A fast clear mode of operation has been presently utilized to compensate for the delay without causing the difficulties that result from signal attenuation. In the fast clear mode operation, timing gate TG 412 issues a gate signal to the PSA unit instructing the unit to start digitizing and integrating the detected γ-radiation signal instantly, without waiting for the coincidence result. This is accomplished because the gate signal to the PSA unit is a signal that is issued instantly when the γ-radiation is detected, independent from other control signals. The fast clear signal is also generated simultaneously for each and every γ-radiation trigger event, independently from the coincidence event between the γ-radiation signal and α-particles. In particular, the fast clear signal is a trigger signal issued from timing gate TG 416 to halt the operation of the PSA that processes the energy data of the detected γ-radiation signal when appropriate, even where there is no coincidence present. To do so, the fast clear signal is generated for each and every γ-radiation trigger event instantly without waiting for a determination result of the coincidence. For example, the OR logic unit 406 is triggered by any γ-radiation hit and drives timing gates TGs 408, 412, 416, 422, each of which generates a predetermined gate signal, preferably about 800 ns long, for QDC Gate for the NaI Detector, a 5 μs long gate for the PSA unit for the HPGe-Detector, the fast clear signal, and an inhibit signal for the CFDs to prevent double triggering, respectively. Preferably, the fast clear signal may be delayed by a predetermined time of about 400 ns to give AND Gate 428 enough time to determine whether there is coincidence for the detected γ-radiation signal.

Upon receiving both the timing gate of about 350 ns and the combined OR output from the α-Time 432, AND logic unit 428 generates a signal that indicates whether there exists a coincidence between the γ and α signals, indicating that the calculated time-of-flight falls within the coincidence window. If it is determined that the coincidence is present, AND logic unit 428 generates a common stop signal for the TDC preventing further triggering of time measurements. At the same time, AND logic unit 428 issues a veto signal of a predetermined length, preferably about 600 ns long to timing gate TG 416, so the already started integration and digitization process will continue and be completed by the PSA unit. If, however, it is determined that the coincidence is not present, the veto signal is not issued from AND logic unit 428, thereby allowing the fast clear signal to clear and reset the on-going integration and digitization process by the PSA unit. At the same time, timing gate TG 416 issues a secondary output to reset the CFD inhibit signals to allow each of the CFDs to be triggered for each γ-radiation trigger event. Therefore, if there is no coincidence, the units for the integration and digitization are fast cleared and there is no need for extended processing time, such as 2.5 ms. Also, if there is no coincidence, then there is no common stop signal issued by AND logic unit 428. As a result, the TDCs overflow and data are not recorded for such events.

In the present embodiment, the data from the PSA and TDC may be read out by CAEN VME V1718 USB bridge, and the output data may be fed into a laptop computer or the like where a program software may be used for further data analysis as illustrated in FIG. 6. In one embodiment, the computer controlled CFD, QDC and PSA units may be set and operated using, among others the National Instruments LabVIEW™ programming environment. For example, a LabVIEW VI may read the data from the CAEN controller and store them on a storage unit such as a disk. The properly timed fast clear, inhibit and reset signals will ensure that the time, charge and pulse height data stay synchronized.

FIG. 6 illustrates one particular exemplary embodiment of data analysis process that records the time delay and amplitude of events from up to 8 NaI and 8 HPGe detectors in coincidence with up to 16 pixels of an alpha detector at the same time. The stored data can be read back and analyzed by selecting one or more directions (pixels) and either a time interval (representing a distance from the neutron generator) or an energy window. In one exemplary embodiment, the program is initially designed to read the data from α- and/or γ-detectors and filter them by selecting alpha pixels, i.e., events with neutron in 1 or more cones. After filtering the data, the time and energy components are further processed separately. With reference to the time component, the data is displayed as a histogram for selected detector events from a cone area of interest and the energy component is filtered out by cursor selected regions on time histogram. In the present embodiment, four energy histogram plots are produced: (1) the unfiltered data, (2) all events in cursor selected region of interest, (3) all events in cursor selected background region, and (4) ROI background. Additionally, the energy data is processed as the unfiltered data which is displayed as a histogram for selected detector events from a cone area of interest and the time component is filtered out by cursor selected regions on energy histogram. Similarly to the energy profile, the time histogram plots are made up of (1) the unfiltered data, (2) all events in cursor selected region of interest, (3) all events in cursor selected background region, and (4) ROI background. The data is then saved on the computer, where the saved data allows for interactive sorting of the data according to prompt and background time or energy windows and an interactive display of γ-ray time and energy spectra for a selected α-detector channels allows for selecting cones within the target. It is also envisioned that the computer performs an energy calibration thereby identifying the gamma-ray lines of interest and identifying the target material.

FIG. 5(a) is a graph that represents the γ-radiation counts over a time range, and FIG. 5(b) is a graph that illustrates the γ-radiation counts over the energy spectrum. These graphs may be obtained from an investigation of a target material such as an explosive stimulant target using the inventive apparatus as explained above. FIG. 5(a) indicates that an about 10 ns coincidence window is set for the "prompt γ-radiation" about 90 ns after α-Detector 10 detects the α-particles, and an about 10 ns coincidence window is set for the "background γ-radiation" about 150 ns after the α-Detector detects the α-particles. The dotted-line of FIG. 5(b) represents the total energy spectrum taken by HPGe-Detector 40 without applying the present time-of-flight filtering method. The solid-line of FIG. 5(b) illustrates the energy spectrum when the time-of-flight filtering method is applied, and only the prompt γ-radiation peak is selected. It is noted that the present method eliminates the huge quantity of background radiation data, and as a result, the weak 5.1 MeV Nitrogen line becomes clearly visible, indicating that the sensitivity and corresponding accuracy of the detecting system has been drastically improved.

The present system can take the form of hardware elements, software elements, or an embodiment containing both hardware and software elements. In one embodiment, the system is implemented with software, which includes but is not limited to firmware, resident software, microcode, etc. Furthermore, the system can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

It will be appreciated by persons skilled in the art that the present invention is not limited to what has been particularly shown and described in this specification. Rather, the scope of the present invention is defined by the claims that follow. It should further be understood that the above description is only representative of illustrative examples of embodiments. For the reader's convenience, the above description has focused on a representative sample of possible embodiments, a sample that teaches the principles of the present invention.

Other embodiments may result from a different combination of portions of different embodiments.

The inventors have not attempted to exhaustively enumerate all possible variations in the specification. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the claims, and other undescribed embodiments are equivalent. Furthermore, all references, publications, U.S. patents, and U.S. patent Publications cited throughout this specification are incorporated by reference as if fully set forth in this specification.

The invention claimed is:

1. A γ-radiation detection system that detects a γ-radiation from a target, comprising:
   a neutron-generator that generates an α-particle and neutron pair, and emits the α-particle and the neutron in opposite directions, in which the neutron is focused on a target within a predetermined direction;
   an α-particle detector that detects the α-particle emitted from the neutron generator and identifies the direction of the neutron on the target;
   a γ-radiation semiconductor detector that detects the γ-radiation emitted from the target irradiated by the neutron within the predetermined direction;
   a data unit configured to acquire data related to energy of the γ-radiation when the γ-radiation semiconductor detector detects the γ-radiation; and
   a control unit configured to calculate a time-of-flight of the neutron by comparing a time when the α-particle detector detects the α-particle and a time when the γ-radiation semiconductor detector detects the γ-radiation within the predetermined direction, and determine whether the γ-radiation is received within a predetermined coincidence window;
   wherein the data unit is further configured to initiate the data acquisition process upon detection of a γ-radiation signal without waiting for the determination by the control unit, and
   wherein the control unit is further configured to allow the data unit to continue and complete the data acquisition process, when it is determined that the detected γ-radiation falls within the predetermined coincidence window, and to stop the data acquisition process when it is determined that the timing of the detected γ-radiation does not fall within the predetermined coincidence window.

2. The γ-radiation detection system of claim 1, wherein the semiconductor in the γ-radiation semiconductor detector is selected from the group consisting of Group III-V semiconductors and Group II-VI semiconductors.

3. The γ-radiation detection system of claim 2, wherein the semiconductor is in the γ-radiation semiconductor detector selected from the group consisting of CdZnTe, CdTe, CdMnTe, HgI$_2$, TlBr, HgCdTe, CdMnTe, HgZnSe, GaAs, PbI$_2$, AlSb, InP, ZnSe, ZnTe, PbO, BiI$_3$, SiC, Hg$_x$Br$_{1-x}$I$_2$, Hg$_x$Cd$_{1-x}$I$_2$, wherein x is greater than 0 and less than 1, InI$_2$, Ga$_2$Se$_3$, Ga$_2$Te$_3$, TlPbI$_3$, Tl$_4$HgI$_6$, Tl$_3$As$_2$Se$_3$, TlGaSe$_2$, and AgGaTe$_2$.

4. The γ-radiation detection system of claim 1, wherein the semiconductor in the γ-radiation semiconductor detector is High-Purity Germanium (HPGe).

5. The γ-radiation detection system of claim 1, further comprising a computer implemented apparatus for comparing the detected radiation signal with a known γ-radiation fingerprint of interest to determine the identity of the target.

6. The γ-radiation detection system of claim 1 further comprises one or more scintillation detectors.

7. The γ-radiation detection system of claim 6 further comprises a charge-to-digital converter.

8. The γ-radiation detection system of claim 6, wherein the scintillation detector is selected from the group consisting of LaBr$_3$, NaI, CsI, CsF, KI, LiI, BaF$_2$, CaF$_2$, ZnS, CaWO$_4$, CdWO$_4$, Y$_3$Al$_5$O$_{12}$, GSO, and LSO.

9. The γ-radiation detection system of claim 1 further comprises a mechanical and passive collimator in front of the γ-radiation semiconductor detector.

10. The γ-radiation detection system of claim 1, wherein the data unit comprises one or more preamplifiers that receive a signal from the γ-radiation semiconductor detector and outputs an energy signal and a timing signal.

11. The γ-radiation detection system of claim 10, wherein the data unit further comprises a peak-sensing analog-to-digital converter (PSA) and a spectroscopy amplifier, wherein the energy signal from the preamplifier is received by the spectroscopy amplifier to make the signal suitable for input to the PSA.

12. The γ-radiation detection system of claim 10, wherein the data unit further comprises a constant fraction discriminator (CFD) that receives the timing signal from the preamplifier.

13. The γ-radiation detection system of claim 12, wherein the timing signal from the preamplifier is preprocessed by a fast filter amplifier before being received by the CFD.

14. The γ-radiation detection system of claim 12, wherein the CFD outputs an emitter coupled logic start signal for a multi-channel multi-event time-to-digital converter (TDC), and an OR output signal to drive an event logic.

15. The γ-radiation detection system of claim 14, wherein the OR output signal
   (i) drives a timer that generates a signal with a predetermined width of about 350 ns for an AND logic unit, and
   (ii) drives an OR logic unit that generates a gate signal for the PSA connected to the γ-radiation semiconductor detector.

16. The γ-radiation detection system of claim 15, wherein the data from the PSA and TDC is read out by CAEN VME V1718 USB bridge, and the output data is fed into a computing device where a program software is used for further data analysis.

17. The γ-radiation detection system of claim 15, wherein computer controlled CFD, QDC and PSA units are set and operated using a programming environment that reads data related to the γ-radiation.

18. A method for detecting a γ-radiation from a target, comprising:
   emitting an α-particle and a neutron pair in opposite directions, in which the neutron is focused on a target within a predetermined direction;
   detecting the α-particle utilizing a position-sensitive α-particle detector and identifying the direction of the neutron;
   detecting the γ-radiation within the predetermined direction by a γ-radiation semiconductor detector;
   comparing a time when the α-particle detector detects the α-particle and a time when the γ-radiation semiconductor detector detects the γ-radiation within the predetermined direction to calculate a time-of-flight of the neutron;

collecting the energy data of the detected γ-radiation;

determining whether the γ-radiation is received within a predetermined coincidence window based on the calculated time-of-flight of the neutron;

continuing and completing the data collection process when it is determined that the γ-radiation is received within the predetermined coincidence window; and halting the data collection process when it is determined that the timing of the detected γ-radiation does not fall within the predetermined coincidence window, wherein detection of a γ-radiation signal initiates the data collection process without waiting for a result from the determining step.

19. The method of claim 18, further comprising comparing the detected radiation signal with a known γ-radiation fingerprint of interest to determine identity of the target.

20. The method of claim 18, wherein the γ-radiation detector is a semiconductor detector.

21. The method of claim 20, wherein the semiconductor detector is HPGe detector.

22. The method of claim 18, wherein the γ-radiation detector comprises one or more semiconductor detectors and one or more scintillation detectors.

23. The method of claim 18, wherein the method further comprises a data analysis step.

24. The method of claim 23, wherein the data analysis step comprises
processing the collected data from α-and γ-detectors by filtering said data in order to select alpha pixels (events with neutron in 1 or more cones),
selecting time as unfiltered display from the selected alpha pixels,
displaying a time histogram for detector events from a cone area of interest,
filtering out energy data by cursor selected regions on time histogram,
selecting energy as unfiltered display from the selected alpha pixels,
displaying an energy histogram for detector events from a cone area of interest,
filtering out time data by cursor selected regions on time histogram,
producing four energy and four time histograms: (1) the unfiltered data, (2) all events in cursor selected region of interest, (3) all events in cursor selected background region, and (4) region of interest background, and saving the data for manual analysis, wherein the saved data allows for interactive sorting of the data according to prompt and background time or energy windows and an interactive display of γ-ray time and energy spectra for a selected α-detector channels allows for selecting cones within the target.

25. The method of claim 24, wherein during the analysis step, energy calibration is performed thereby identifying the gamma-ray lines of interest and the target material.

* * * * *